Patented Apr. 17, 1951

2,549,558

UNITED STATES PATENT OFFICE 2,549,558

ASPHALT RESIN COMPOSITIONS

David W. Young, Roselle, John D. Garber, Cranford, and William J. Sparks, Westfield, N. J., assignors to Standard Oil Development Company, a corporation of Delaware No Drawing. Application June 28, 1947, Serial No. 757,936

7 Claims. (Cl. 260—23.7)

1

This invention relates to improvements in the preparation of elastic resin asphalt compositions, and relates particularly to the preparation of elastic resin asphalt compositions containing asphalts, drying oil, and hydrocarbon resins obtained by copolymerizing multi-olefins with iso-olefins. These elastic resin asphalt compositions are adapted for many uses, for example, in the preparation of a base for paints, battery box compositions, floor tiles, insulating panels, roof coating compositions, especially when used to coat layers of fiber, or paper, in built up roof coating compositions, paper laminating, caulking compositions, coating electric board panels, coating transformers, etc.

Hard, brittle hydrocarbon resins are obtained by copolymerizing multi-olefins, or poly-enes which have 2 or 3 double bonds, with minor proportions of mono-, or iso-olefins at low temperatures. These hard, brittle hydrocarbon resins prepared by the copolymerization of a multi-olefin such as butadiene with iso-olefins having an iodine number of 75 to 200 and a ring and ball softening point from 75° C. to 130° C., are soluble in drying oils such as perilla, tung, lallemantia, candle nut, modified fish, linseed oil, etc., and also mutually soluble and compatible with asphalt. High softening point asphalts such as the gilsonite, glance pitch, or grahamite type, together with linseed oil, are preferably blended with the hard, brittle hydrocarbon resins in the preparation of compositions that are of exceptional value in a number of applications. The asphalt used may be gilsonite having the following physical properties:

| | |
|---|---|
| Color mass | Black |
| Lustre | Bright |
| Streak | Brown |
| Specific gravity at 77° F. | 1.07 |
| Hardness on Mohs' scale | 2 |
| Hardness, needle-penetrometer at 77° F. | 0.3 |
| Susceptibility index | 100 |
| Fusing point (R and B method) | 270°–400° F. |

Asphalts prepared from petroleum oils may also be used especially those prepared from Venezula asphalt base crudes, in which a gas oil fraction is thermally cracked, reduced to 120° to 130° F. softening point and oxidized to about 300° F. softening point. A modified linseed oil may be necessary to obtain the desired solution.

The time to cook, or body, an asphalt-linseed oil blend is greatly reduced by using the butadiene-diisobutylene resins in composition. Body is the heating time required to polymerize the blend to whatever consistency is required according to the proposed use of the finished products, i. e., as a paint base, tile composition, as a binder in laminating paper, etc., For example, the viscosity of an unbodied blend will be less than one poise, and during heat bodying this will increase in value between 3 and 25 poises, depending on the viscosity to which we intend to carry this step. It is well known in the industry that the bodying time, or cook-time, in linseed oil blends to prepare a paint base is about 7–8 hours at 294° C. It has now been found that when the hard brittle diolefin-diisobutylene resins, for example, the butadiene-diisobutylene resins are used with asphalt and about 20–50% linseed oil, the cook time at 290° C. to obtain a paint base is reduced from about 8 hours to about 2–4 hours. Not only is this improvement in the manufacturing step obtained, but the resulting paint films obtained on using an asphalt, linseed oil-resin blend paint are superior to the films obtained on using straight blend linseed oils. The unexpected properties of the films obtained by applying asphalt linseed oil diolefin-diisobutylene resin blend paint are as follows:

1. Excellent adhesion to steel.
2. Excellent flexibility of both new, or aged film samples.
3. Mineral oil, soap, water and grease resistance.

In the past gilsonite linseed oil compositions and films obtained by using a gilsonite linseed oil paint could not be used in underground applications near large oil refineries, as the resulting paint films had very poor mineral oil resistance and would dissolve, become soft, and therefore, were of little value. It has now been found that paints containing the hard, brittle, diolefin-diisobutylene resin-gilsonite-linseed oil compositions, because of their improved mineral oil resistance, can be successfully used in underground application near oil storage tanks in refineries. The asphalt-diolefin-diisobutylene resin linseed oil containing paints upon drying adsorbs, or combines with oxygen as well as combines with the linseed oil to form a very polar, and insoluble type film. Other drying oils may be used, especially modified fish oil, or tung oil. This example of linseed oil is for illustration only, and not as a limitation.

The butadiene-diisobutylene type copolymers prepared by the low temperature polymerization method, are more effective in the production of improved films as shown by tests when compared with paints prepared from other hydrocarbon resins, such as the styrene, butadiene copolymers or the alpha methyl styrene-isoprene type copolymers.

The aromatic olefin butadiene type copolymers are quite soluble with linseed oil at 294° C. However, upon cooling these aromatic type copolymers separate from solution and form very cloudy films. The advantage of having a hydrocarbon brittle solid copolymer that co-reacts with the asphalt linseed oil at 294° C., and upon cooling remaining perfectly homogeneous, and without any separation is in part the explanation for the improved final properties obtained as mentioned previously. A typical blend formula is as follows:

|  | Per cent | Per cent |
|---|---|---|
| Non-volatile | | 54 |
| Gilsonite type gum | 81 | |
| Linseed Oil | 10 | |
| Hydrocarbon Resin (60% Butadiene) (40% Dimer) | 5 | |
| Asbestos (80%—200 Mesh) | 4 | |
| Volatile | | 46 |
| Xylol | 13 | |
| Petroleum Thinner | 87 | |
|  | 100 | 100 |

This particular blend was prepared first by cooking the resin in the gilsonite linseed oil blend and then reducing the viscosity by the addition of solvents. This blend was found to be brushable, and it was placed on a wire screen at room temperature. After 24 hours this wire screen, used previously to support a crucible on a Bunsen burner, could be flexed about 20 times at a 90° angle and show no separation of the film from the steel. A similar composition without resin and of gilsonite and linseed oil cut back to the same viscosity with thinners was found by the same test to have much poorer adhesion to the wire screen, by the same flex test.

Wetting agents may also be incorporated into the asphalt diolefin-diisobutylene resin linseed oil composition to obtain better adhesion, especially when applied on damp days, or to damp surfaces. For example, tertiary alkoxy amino silanes, copper naphthenate, lead naphthenate, aluminum or calcium sulphonate, mahogany sulphonate, etc.

The butadiene-diisobutylene solid clear hydrocarbon resins, that contain from 40 to 75% butadiene by analysis, are quite soluble in oxidized Columbian asphalt (S. P. 160–180° F.), steam reduced asphalt (S. P. 160–170° F.), and cracking-coil tar. It has been found that the butadiene-diisobutylene resins, that contain from 40% to 75% butadiene by analysis, when added to asphalt and heated, greatly improve the heat softening point of the asphalt. Results are as follows:

*Butadiene-diisobutylene resin—Asphalt blends*

[Heated 2 hrs. at 250° C.]

| Type of Asphalt | Softening Point (R & B) | Butadiene-[1] Diisobutylene Resin Present |
|---|---|---|
|  | ° F. | Per cent |
| Oxidized Columbian | 178 | 0 |
| Do | 209 | 10 |
| Do | 217 | 20 |
| Steam-reduced Asphalt | 170 | 0 |
| Do | 179 | 10 |
| Do | 182 | 20 |

[1] Analysis of resin (55% butadiene 45% diisobutylene-softening point 100° C.).

Also, five sets of steel panels were painted with the asphalt-butadiene-diisobutylene linseed oil resin paints, and one steel panel with an asphalt-linseed oil paint. The thickness of the paint was 0.0010. The panels were then placed on a roof and allowed to weather for one year. Results are listed:

| Sample No. | Per Cent Hydrocarbon Resin | Per Cent Hydrocarbon Thinner #2 by weight | Per Cent Oxidized Asphalt | Appearance at end of Test | | |
|---|---|---|---|---|---|---|
| | | | | Checking | Rusting | Chalking |
| 1 | 0 | 60 | 40.0 | Yes | Yes | Yes. |
| 2 | 2.5 | 60 | 37.5 | Slight | In Spots | Do. |
| 3 | 5.0 | 60 | 35.0 | do | No | No. |
| 4 | 10.0 | 60 | 30.0 | None | do | Do. |
| 5 | 15.0 | 60 | 25.0 | do | None | None. |
| 6 | 15.0 | 60 | 25.0 | do | do | Do. |

The hydrocarbon thinner is a highly aromatic thinner having a sp. gr. ranging from 0.835 to 0.883, flash up to 178° F., distillation 210° F. to 400° F., Kauri-Butanol value 75–80, mixed aniline point 16.5° C. to 21° C., and from 73 to 92% aromatics.

It is to be noticed that the butadiene-diisobutylene resin improved the properties of asphalt paints.

This is a continuation-in-part application of U. S. application Serial No. 604,350, filed July 11, 1945.

In the presence of various modifying agents, or copolymerizates, particularly the mono- or iso-olefins having from 3 to 18 carbon atoms per molecule, preferably 8 to 12 carbon atoms to the molecule, the character of the polymerization reaction is very greatly modified to yield a copolymer or interpolymer which is composed of a major proportion of the multi-olefin having from 4 to 14 carbon atoms to the molecule, preferably 4 to 10, and a minor proportion of the iso-olefin. This polymer is a solid resin of low elasticity, non-rubbery in character, but of good strength, readily soluble in a wide range of solvents including such substances as the hydrocarbons generally, and a wide range of the natural and synthetic oils and resins. In addition, the material may have, to a more or less degree, according to the percent conversion of the original mixture, and the degree of cyclization of the finished polymer, the unique property of heat body without molecular weight breakdown, or discoloration.

As produced, the resins have relatively high iodine numbers, usually between 30 and 275, and they have in addition the important property of oxidation drying in a manner analogous to that of the drying oils. Of particular importance is the fact that they are readily soluble in the natural and synthetic oils and the drying and baking oils generally; and can be heat bodied while in such solution to yield extremely valuable varnish and paint compositions.

The polymerization of the butadiene and the diisobutylene to form the resin is conducted at a temperature below +10, and usually above —40, this being the preferred range, although in some instances the polymerization temperature may be as low as —103° C.

The catalyst may be any liquid, or dissolved Friedel-Crafts halide material. Gaseous boron trifluoride is not a satisfactory catalyst since a sufficiently high concentration cannot be built up in the reactor and it tends to polymerize the butadiene alone into an undesirable polymer. The preferred type of catalyst is a strong solution or a saturated solution of aluminum chloride in methyl or ethyl chloride; the preferred concentration ranging from 0.8% to about 7%.

Alternatively, any of the catalysts disclosed by N. O. Galloway in his article on "The Friedel-Crafts Synthesis," printed in the issue of "Chemical Reviews," published for the American Chemical Society at Baltimore in 1935, in volume XVII, No. 3, the article beginning on page 327, the list being particularly well shown on page 375, may be used. That is, in addition to dissolved aluminum chloride, such substances as liquid titanium tetrachloride; or aluminum bromide, or aluminum chlorobromide, or aluminum alkoxy bromide in solution in the lighter petroleum hydrocarbons, or in solution in ethyl or methyl chloride, or carbon disulfide may be used. Similarly, boron trifluoride in 40–60% solution in the solvents may also be used.

For the solvent, practically any oxygen-free organic material having 1 to 8 or 10 carbon atoms per molecule, which is liquid at temperatures below 0° C. thereby being low freezing; which may be vaporized away from the Friedel-Crafts catalyst with a change in temperature of no more than one or two degrees, thereby being non-complex-forming, may be used.

The liquid catalyst is preferably delivered in the form of a fine, relatively high pressure jet into the body of the rapidly stirred olefinic material in the reactor. It may be delivered continuously in the form of a very fine stream, or may be delivered intermittently in the form of a coarser stream. It is desirable that the time of addition of the catalyst amount to a substantial number of minutes depending upon the size of the reactor and the amount of olefinic material therein. If the batch is small, on the order of less than a gallon, the catalyst delivery time is conveniently five to sixty minutes. If the batch size is from one to fifty gallons, the catalyst delivery time desirable is from 30 to 200 minutes. If the batch size is 100 to 1000 gallons, the catalyst delivery time is conveniently in the neighborhood of one to four hours.

If the reaction mixture is the preferred one containing butadiene and isobutylene dimer with propane and a substantial amount of ethyl or methyl chloride solvent from the catalyst; the dimer having a boiling point of approximately $+100°$ C. shows very little vaporization, the vaporized mixture contains as its major component propane, as its minor component, butadiene, and as a trace to non-important component the ethyl chloride. All three are, however, condensed in the reflux coil, cooled to a temperature down to the range between $-40°$ C. and $-78°$ C., and returned to the reaction mixture where they are rapidly stirred in. The boiling point of the mixture, because of the presence of considerable quantities of dimer and dissolved polymer, tends to be in the neighborhood of $-25°$ C. to $+0°$ C., and when the temperature gets down to about $-40°$ C. too little reflux is produced to bring in much additional cold liquid. Accordingly, even though the reflux condenser is intensively cooled, the temperature does not go much below the minimum boiling point of the mixture.

It is usually preferable to halt the polymerization short of complete polymerization of all of the olefinic material in the original mixture. The preferred yield is from 60% to 80%. At this yield the contents of the reactor remain liquid in the form of a clear yellow fluid of about the consistency of molasses.

By this embodiment of the invention there is thus obtained an exceedingly valuable solution of polymeric resin which has many important uses.

These uses may be for such items as adhesives, coatings for paper, wood, iron, glass, plastics, and the like. The polymer and asphalt-polymer blends may also be compounded into all of the rubber-like substances including caoutchouc, Buna S, Perbunan, Polybutadiene, Butyl, polychloroprene, and the like. The resin is also compatible with, and may be compounded into, practically all of the thermoplastic and thermosetting resins, without exception. The polymer is compatible with sulfonated corn oil product on which it shows a substantial stiffening and hardening action. The resin is also compatible with, and soluble in, all of the mineral oils; all of the hydrocarbons, and also in all of the waxes and asphalts, in which it serves to produce a substantial and valuable hardening and stiffening action, and usually a substantial increase in the melting point. In lubricating oils it shows a substantial thickening effect, and a substantial increase in the viscosity index.

EXAMPLE 1

(Preparation of butadiene-diisobutylene resin)

Utilizing a storage reservoir, having an 80 gallon capacity, approximately 9 gallons of diisobutylene were metered into the storage drum at approximately room temperature. When the diisobutylene was entirely added, approximately 15 gallons of liquid propane cooled to $-78°$ C. by passage through a "dry ice" or solid $CO_2$ cooling coil was delivered to container. In the meantime, the material had been thoroughly stirred by a motor driven agitator. When the temperature had been reduced to approximately $-28°$ C., 13½ gallons of butadiene were delivered to the storage container, and in order to maintain the temperature of $-28°$ C., a continuing small stream of liquid propane cooled to $-78°$ C. was added at a rate of approximately 12 gallons per hour. This material was then delivered to the reactor, continuing the slow addition of liquid propane.

Simultaneously a solution of aluminum chloride in ethyl chloride was prepared in a concentration of 3.6%. This catalyst solution was cooled to $-78°$ C. and delivered in the form of a fine stream of jet into the mass of the material in the reactor, maintaining a rapid stirring of the entire reactor contents during the delivery of the catalyst. Care was taken to ensure the addition of the catalyst entirely under the surface of the reaction mixture in order to avoid polymerization of the butadiene vapors alone in the vapor space above the liquid since such polymerization yields an insoluble infusible polymer, called by the workmen "popcorn," which is useless and a waste of butadiene. The addition of the catalyst continued over about one hour and approximately 8 gallons were added. This amount of catalyst was sufficient to polymerize approximately 55% of the olefinic material in the original mixture. When all the catalyst had been added, steam was turned into a steam heating coil around the reactor and the temperature of the reaction mass was raised to about $-6.6°$ C. ($+20°$ F.); no liquid propane being added to the reactor during this time. When the temperature had reached $-6.6°$ C. ($+20°$ F.) the steam supply was discontinued and the polymer mixture was allowed to remain in the reactor with gentle stirring for ½ hour. At the end of this time, approximately one-half gallon of a mixture of equal parts of 99% butyl alcohol and a 36 weight percent water solution of ammonium hydroxide was added to the reactor. This mixture served to inactivate the catalyst. The mixture was stirred with the alcoholic ammonia solution for ten minutes. At the end of this time the thick syrupy liquid solution was drained from the reactor to a steam jacketed kneader in which it was stirred and kneaded between kneader blades. Simultaneously, steam was delivered to a steam jacket on the kneader and the temperature was gradually raised. The continued stirring, kneading and heating stripped out the propane, the unreacted butadiene, the ethyl chloride of the catalyst solution and the unreacted dimer and the water, ammonia, and isopropyl alcohol. This treatment was continued over a period of two hours during which time the temperature of the mass in the kneader rose to 118° C. At this point the steam supply was discontinued and approximately 25 pounds of solid carbon dioxide was added to the resin in the kneader to cool it below its softening point and to make it sufficiently brittle to be easily removed from the kneader. The resulting resin was nearly water white, with a very slight yellow color from minor amounts of iron impurities. The yield of solid dry resin was 70% of the original weight of butadiene and dimer.

A proximate organic analysis was made for carbon and hydrogen with the following results:

Percent carbon_____ 85.28
Percent hydrogen_____ 12.58

The carbon to hydrogen ratio was 6.8.

A portion of the resin was then dissolved in toluene and reprecipitated by the addition of a small portion of isopropyl alcohol. The precipitate was separated, the residual traces of toluene evaporated out and the material was again analyzed to yield the following proximate analysis:

Percent carbon_____ 85.43
Percent hydrogen_____ 12.41

The carbon to hydrogen ratio was 6.9.

These results show that a true copolymer was formed since the hydrogen to carbon ratio did not change within the experimental error of analysis. This resin was found to be soluble in cracking-coil to to a concentration of 15% by weight.

EXAMPLE 2

A mixture was prepared in a tank which consisted of 7 parts by weight of liquid isoprene, 90 parts by weight of methyl chloride and 6 parts by weight of trimethyl ethylene. This material was delivered to polymerizer tanks and was polymerized by the addition thereto of approximately 10 parts by weight of a 3.5% solution of aluminum chloride in methyl chloride, as before described. The polymerizate was discharged into a flash still in which the unvolatilized methyl chloride was boiled out for subsequent recovery and reuse, and residual portions of isoprene and trimethyl ethylene were also separated to yield a solution of polymer in medium naphtha. The reaction proceeded smoothly and easily and the polymer dissolved readily in the medium naphtha to yield a solution of the polymer in medium naphtha. Vaporization of the naphtha showed that the polymer was not quite a solid but was a very heavy, viscous oil having an iodine number of approximately 200 and a Staudinger molecular weight number of approximately 800. To this material there was then added the gms. of lead and cobalt naphthenate, and the material was warmed up and blown briefly with air to obtain a partial thickening. The fluid solution was then spread upon panels and the naphtha allowed to evaporate leaving behind a good film of heavy, almost solid polymer. This polymer was then baked at 290° F. for 50 minutes whereupon it was found to be converted to a hard, tough, non-brittle protective film which was found to be highly resistant to solvents, acid, alkali, and weathering. This unheated polymer was soluble in 10% concentration in oxidized asphalt. This asphalt polymer blend was found to have good adhesion when added as a hot melt to steel.

EXAMPLE 3

A mixture was similarly prepared consisting of 5 parts by weight of styrene, 8 parts by weight of isoprene, and 9 parts by weight of trimethyl ethylene together with 9 parts by weight of methyl chloride. This mixture was then cooled to approximately −30° C. and delivered to reactors where it was polymerized by the addition of approximately 10 parts by weight of 3.5% solution of aluminum chloride in methyl chloride. This amount of catalyst was sufficient to give nearly 100% conversion in the olefinic materials. The resulting polymerizate mixture was a moderately heavy, viscous solution. This material was also delivered to a flash still in which the residual methyl chloride and unpolymerized olefins were removed to yield a solution of polymer in naphtha. The resulting polymer was found to have an iodine number of approximately 175 and upon volatilization of the naphtha, was found to be a solid, but soft, plastic substance. The usual amounts of naphthenate dryers were added to the solution and it was used as a coating composition. It dried tack-free in approximately 3½ to 4 hours and in 96 hours it oxidized to a solid, tough, flexible, protective film. Other portions were applied as surface films and baked by heating to 290° F. for approximately one hour to yield a very durable, tough, non-brittle, insoluble protective film. This polymer before heating was soluble in steam reduced asphalt (S. P. 170° F.), the polymer asphalt blends with 5% resin or polymer were found to have very good adhesion to steel, glass, concrete, and wood.

EXAMPLE 4

A mixture was prepared consisting of 75 parts by weight of octadecylene with 50 parts by weight of butadiene in 125 parts by weight of methyl chloride. This material was delivered to the reactors at a temperature of approximately −40° C. and was polymerized therein by the addition of approximately 50 parts by weight of a 3.5% solution of aluminum chloride in methyl chloride. This material was delivered from a polymerizer tank and was then treated with approximately 100 parts by weight of isopropyl alcohol. Upon removal of the volatiles and alcohol, the polymer was found to be a solid, but relatively soft, resin which was readily soluble in naphtha type solvents and compatible with linseed oil and the other drying oils and customary varnish and paint, resins and gums to yield an excellent varnish and paint base. This resin was soluble in asphalt at a weight concentration of 5%.

While there are above disclosed but a limited number of embodiments of the process and products of the invention, it is possible to produce still other embodiments without departing from the inventive concept herein disclosed and it is therefore desired that only such limitations be imposed on the appended claims as are stated therein or required by the prior art.

We claim:

1. A process for preparing a paint which comprises heating to 294° C. a mixture of 81% gilsonite asphalt, 10% linseed oil, 5% hydrocarbon resin consisting of 60% butadiene, and 40% diisobutylene, and 4% of asbestos to obtain a solution of uniform composition, and adding a volatile thinner consisting of 13% xylol, and 87% of petroleum thinner, distilling between 210° and 400° F.

2. An elastic resin asphalt composition adapted for use as a base in paints, and as an adhesive for roofing compositions, floor tiles, caulking compositions, and insulating panels, which comprises in combination a copolymer resin containing from 40% to 75% of a multi-olefin having from 4 to 14, inclusive, carbon atoms per molecule, and from 60% to 25% of a mono-olefin having from 3 to 18 carbon atoms per molecule prepared by polymerization at a temperature within the range between —40° C. and +10° C. by the application to the cold mixture of a Friedel-Crafts catalyst; the said resin being characterized by an iodine number within the range between 75 and 200 and a softening point (by the ball and ring method) within the range between 75° C. and 130° C. and solubility in drying oils and in asphalt, together with a vegetable drying oil and an asphalt having a softening point within the range between 160° F. and 400° F.

3. An elastic resin-asphalt composition adapted for use as a base in paints, battery box compositions, roofing compositions and the like which comprises in combination a copolymerized, hard, brittle hydrocarbon resin composed of from 40% to 75% of a multi-olefin having having from 4 to 10, inclusive, carbon atoms per molecule with from 60% to 25% of a mono-olefin having from 3 to 18 carbon atoms per molecule prepared by copolymerization at a temperature between +10° C. and —40° C. by the application to the cold olefinic material of a Friedel-Crafts active metal halide catalyst to yield a hard, brittle resin characterized by an iodine number within the range of 75 and 200, a softening point (by the ball and ring method) within the range between 75° C. and 130° C. and solubility in a vegetable drying oil and in asphalt, together with a vegetable drying oil and an asphalt having a softening point within the range between 120° F. and 300° F.

4. An elastic resin-asphalt composition adapted for use as a base in paints, battery box compositions, roofing compositions and the like, which comprises in combination a copolymerized, hard, brittle hydrocarbon resin composed of from 40% to 75% of a multi-olefin having from 4 to 10, inclusive, carbon atoms per molecule with from 60% to 25% of a mono-olefin having from 3 to 18 carbon atoms per molecule prepared by copolymerization at a temperature between +10° C. and —40° C. by the application to the cold olefinic material of a Friedel-Crafts active metal halide catalyst to yield a hard, brittle resin characterized by an iodine number within the range of 75 and 200, a softening point (by the ball and ring method) within the range between 75° C. and 130° C. and solubility in a vegetable drying oil and in gilsonite, together with linseed oil and gilsonite.

5. An elastic resin-asphalt composition adapted for use as a base in paints, battery box compositions, floor tiles, roofing compositions and the like, which comprises a copolymerized, hard, brittle hydrocarbon resin composed of from 40% to 75% of butadiene copolymerized with from 60% to 25% of diisobutylene at a temperature within the range between +10° C. and —40° C. by the application to the cold olefinic material of a Friedel-Crafts active metal halide catalyst, together with linseed oil and gilsonite.

6. An elastic resin-asphalt composition adapted for use as a base in paints, battery box compositions, floor tiles, roofing compositions and the like, which comprises a copolymerized, hard, brittle hydrocarbon resin composed of from 40% to 75% of butadiene copolymerized with from 60% to 25% of diisobutylene at a temperature within the range between +10° C. and —40° C. by the application to the cold olefinic material of a Friedel-Crafts active metal halide catalyst said copolymerization being carried out in the presence of a volatile, organic solvent diluent; together with linseed oil and gilsonite.

7. An elastic resin-asphalt composition adapted for use as a base in paints, battery box compositions, floor tiles, roofing compositions and the like, which comprises a copolymerized, hard, brittle hydrocarbon resin composed of from 40% to 75% of butadiene copolymerized with from 60% to 25% of diisobutylene at a temperature within the range between +10° C. and —40° C. by the application to the cold olefinic material of a Friedel-Crafts active metal halide catalyst, together with linseed oil and gilsonite and a petroleum aromatic thinner characterized by a boiling point below 400° F.

DAVID W. YOUNG.
JOHN D. GARBER.
WILLIAM J. SPARKS.

REFERENCES CITED

The following references are of record in the file of this patent:

UNITED STATES PATENTS

| Number | Name | Date |
| --- | --- | --- |
| 1,957,179 | Milar | May 1, 1934 |
| 2,039,364 | Thomas et al. | May 5, 1936 |
| 2,047,889 | Roskosky | July 14, 1936 |
| 2,092,295 | Van Peski et al. | Sept. 7, 1937 |
| 2,276,893 | Thomas | Mar. 17, 1942 |
| 2,443,212 | Waldie | June 15, 1948 |

OTHER REFERENCES

Asphalts and Allied Substances, Abraham, 4th ed., 1938, page 722.